J. C. BARROW.
HAND WARMER.
APPLICATION FILED AUG. 13, 1921.

1,429,397.

Patented Sept. 19, 1922.

J. C. Barrow

INVENTOR.

BY

Mason Fenwick & Lawrence

ATTORNEYS

Patented Sept. 19, 1922.

1,429,397

UNITED STATES PATENT OFFICE.

JOHN C. BARROW, OF PHILADELPHIA, PENNSYLVANIA.

HAND WARMER.

Application filed August 13, 1921. Serial No. 492,099.

*To all whom it may concern:*

Be it known that I, JOHN C. BARROW, a citizen of the United States, residing at Philadelphia, in the county of Philadelphia and State of Pennsylvania, have invented certain new and useful Improvements in Hand Warmers; and I do hereby declare the following to be a full, clear, and exact description of the invention, such as will enable others skilled in the art to which it appertains to make and use the same.

This invention relates to new and useful improvements in hand warmers, and more particularly to a device of this character which is especially adapted for use in connection with automobile steering wheels to eliminate the discomfort and sometimes danger which results from cold and often numb fingers while operating the machine in cold weather.

The main object of this invention is the provision of a hand warmer of the above type which can be quickly and readily connected to the hand control or steering mechanism and used for eliminating the discomfort suffered by the operator during cold weather and is extremely simple in its construction and the heating element so constructed as to use a minimum supply of electricity during operation.

With the above and other objects in view the invention consists in the novel features of construction, combination and arrangement of parts hereinafter more fully set forth, pointed out in the claims and shown in the accompanying drawings in which:

Figure 1:
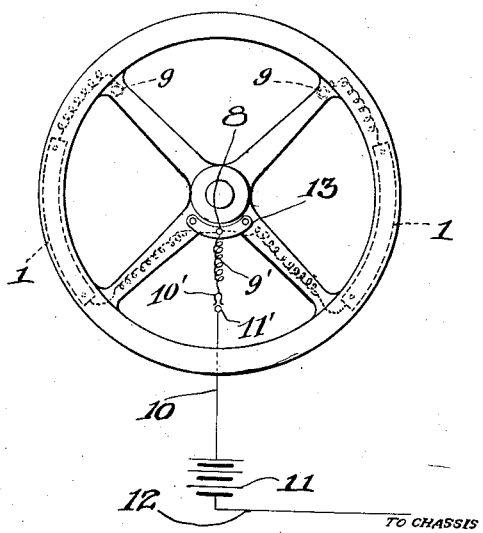
Figure 1 is a plan view illustrating a diagrammatic view of a steering wheel showing my invention applied thereto.
Figure 2:
Fig. 2 is a top plan view of one of the heating members.
Figure 3:
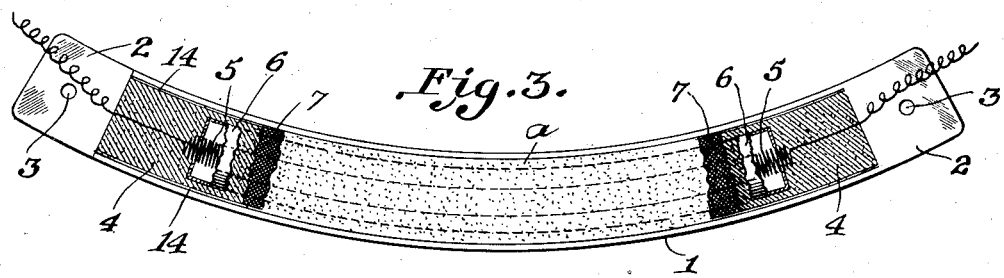
Fig. 3 is a bottom plan view, parts thereof being broken away and illustrated in section.

In the construction of my improved hand warmer, I provide two like segments arranged upon opposite sides of the steering wheel as shown in Fig. 1 and so disposed that when the hands of the operator grasp the steering wheel they will come in contact with these segments and should it be found desirable to attach these segments to the control levers, the segments may be constructed and arranged so that they can be quickly and readily applied to the control levers in the proper position whereby the hands of the operator will come in contact with the segments when grasping the control levers.

Figure 4:
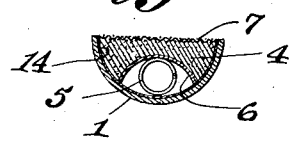
Fig. 4 is a transverse sectional view of one of the heating members.

Each of the segments comprise a metal shell 1 preferably arcuate in cross section as shown in Fig. 4 having flattened end portions forming perforated ears 2, the perforations 3 in said ears being provided for the reception of screws or other fastening means whereby these segments may be quickly and readily attached to the steering wheel or control levers.

In mounting the heating element or resistance coil within the shell 1 it is preferred to imbed the same in cement generally indicated by the numeral 4 which is water proof, an electrical insulator, and a non-conductor of heat. Arranged within this cement is the resistance coil 5, the ends of which extend outwardly upon the inner side of the ears 2 and arranged between portions of the cement and the coil is a heat reflector 6 in the present instance, illustrated as constructed of mica although it will be apparent that any other suitable material may be used. The mica reflector is so arranged as to reflect the heat from the resistance coil 5 outwardly onto the shell 1 so as to quickly heat the shell when a current has been supplied to the coil.

In order to retain the cement in position within the shell 1, a layer of copper fabric 7 is arranged over the cement at the open side of the shell and in order to conceal the copper fabric, a layer of plaster Paris or any other suitable material as indicated at *a* may be spread over the fabric in order to cover the same and retain it in position over the cement. It may be found necessary to secure this fabric 7 to the shell 1 and any suitable fastening means may be employed.

In Fig. 1, I have illustrated the manner of arrangement in attaching the units to the steering wheel, said units being arranged upon opposite sides of the center of the wheel and one of the wires forming each of said units being connected to the binding post 8, while the wires extending from the opposite ends of the units are attached to the posts 9 connected to the spokes of the steering wheel so that these wires will be grounded at this point.

It will be noted that the binding post 8 is mounted upon a fibre segment 13 which is attached to the spokes of the steering wheel at a point adjacent the center of the wheel and also connected to the binding post 8 is a wire 9', having a yieldable connecting clip 10' adapted to engage a member 11' which is attached to the wire 10 so as to provide a supply of current to the units. The wire 10 is connected to the batteries 11 and the circuit is then grounded to the medium of the wire 12 upon the chassis or other part of the machine.

It will be noted from the above that by having yieldable clip connection, should the device be used on a steering wheel provided with a nut-lock or other locking device, the wheel can be whirled entirely around, which frequently is done and thus automatically opens the circuit.

From the above description taken in connection with the accompanying drawings, it will be readily apparent that I have provided a very efficient hand warmer which can be quickly and readily applied to steering wheels and control levers of motor vehicles, aeroplanes and the like, whereby the hands of the operator may be kept comfortable during operation of the machine in cold weather. It will also be apparent that the device is extremely simple in construction and can be quickly and readily attached for use.

In order to properly insulate the metal shell 1, a lining 14 of any suitable insulating material is arranged upon the interior of the shell 1 as clearly illustrated in Fig. 4.

I claim:

1. A device of the class described including an arcuate body member having perforated ears at each end, a resistance coil arranged within said body member, means for retaining said coil in position within the body and a reflector embracing the coil causing the heat therefrom to be reflected toward the closed side of the body.

2. A device of the class described including an arcuate body, a resistance coil arranged within the body, cement-like material arranged within the body and embracing the coil to retain the same in position and a sheet of foraminous material arranged over the material within the body to retain the same in position and perforated ears arranged at each end of the body as and for the purpose set forth.

3. A device of the class described including an arcuate body member, a resistance coil arranged therein, cement-like material surrounding the coil to retain the same in position, an insulating lining arranged between the body and the material therein, a foraminous sheet arranged over the open end of the body to retain the cement-like material in position and a reflecting element arranged adjacent the coil whereby to reflect the heat of the coil toward the closed side of the body.

4. A device of the class described including an arcuate body member, a resistance coil arranged within said body member and a reflector embracing the coil causing the heat therefrom to be reflected toward one side of the body.

5. A device of the class described including an arcuate body member closed at its ends, a resistance coil arranged within said boy and a reflector embracing the coil causing the heat therefrom to be reflected toward the closed side of the body.

In testimony whereof I affix my signature.

JOHN C. BARROW.